US008629200B2

(12) United States Patent
Lin et al.

(10) Patent No.: US 8,629,200 B2
(45) Date of Patent: Jan. 14, 2014

(54) ORGANIC/INORGANIC COMPOSITIVE DISPERSANT INCLUDING INORGANIC CLAY AND ORGANIC SURFACTANT

(71) Applicant: National Taiwan University, Taipei (TW)

(72) Inventors: Jiang-Jen Lin, Taipei (TW); Wei-Ting Chen, Tapei (TW); Yen-Chi Hsu, Taipei (TW); Chih-Wei Chiu, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 13/726,218

(22) Filed: Dec. 23, 2012

(65) Prior Publication Data

US 2013/0109787 A1 May 2, 2013

Related U.S. Application Data

(63) Continuation of application No. 12/765,853, filed on Apr. 22, 2010, now Pat. No. 8,362,092.

(30) Foreign Application Priority Data

Apr. 23, 2009 (TW) .............................. 98113565 A

(51) Int. Cl.
*C08K 13/02* (2006.01)
*C08K 13/04* (2006.01)
*C08K 5/41* (2006.01)
*H01G 9/035* (2006.01)

(52) U.S. Cl.
USPC ............. 523/453; 524/445; 524/80; 524/156; 524/186; 524/188; 524/361; 525/396; 516/101

(58) Field of Classification Search
USPC ........... 516/21, 100, 101, 79; 554/76; 556/26, 556/173, 178; 252/62.2; 523/453; 524/80, 524/445, 156, 361, 186, 188; 525/396
See application file for complete search history.

(56) References Cited

U.S. PATENT DOCUMENTS 6,521,690 B1 * 2/2003 Ross et al. .................... 524/445
(Continued)

FOREIGN PATENT DOCUMENTS

WO WO 2007/133736 A2 * 11/2007
WO WO 2008/045270 A1 * 4/2008

OTHER PUBLICATIONS

Bippus et al, "Laponite and hybrid surfactant/laponite particles processed as spheres by spray-drying", New Journal of Chemistry, 2009, 33, pp. 1116-1126 (published online Mar. 6, 2009).*
Sigma-Aldrich Polyoxyethylene 20 Cetyl Ether Product Information, online @ http://www.sigmaaldrich.com/etc/medialib/docs/Sigma/Product_Information_Sheet/1/p5884pis.Par.0001.File.tmp/p5884pis.pdf (Feb. 6, 2003).*

(Continued)

*Primary Examiner* — Daniel S Metzmaier
(74) *Attorney, Agent, or Firm* — Pai Patent & Trademark Law Firm; Chao-Chang David Pai

(57) ABSTRACT

The present invention provides an organic/inorganic compositive dispersant and a method for producing the same. The compositive dispersant comprises a complex of inorganic clay and an organic surfactant. The compositive dispersant is produced by reacting inorganic clay with the organic surfactant in a solvent to generate a complex. The inorganic clay is layered or platelet. The organic surfactant is an anionic surfactant such as alkyl sulfates, or a nonionic surfactant such as octylphenol polyethoxylate and polyoxyethylene alkyl ether. The compositive dispersant may be used to produce electrolytes of a solar cell or to increase the hardness of an epoxy resin.

4 Claims, 7 Drawing Sheets

(56) References Cited

U.S. PATENT DOCUMENTS

| | | | |
|---|---|---|---|
| 8,362,092 B2* | 1/2013 | Lin et al. | 516/21 |
| 2007/0243401 A1* | 10/2007 | Hirata et al. | 428/546 |
| 2007/0275546 A1* | 11/2007 | Maruyama et al. | 438/497 |
| 2008/0009568 A1* | 1/2008 | Kumar et al. | 524/445 |
| 2009/0014691 A1* | 1/2009 | Kint et al. | 252/500 |
| 2009/0146107 A1* | 6/2009 | Lin et al. | 252/363.5 |
| 2009/0226744 A1* | 9/2009 | Dinega | 428/454 |

OTHER PUBLICATIONS

Tiezhu Fu et al, "Epoxy resin/exfoliated clay hybrid materials with high thermal properties", Polymer Composites, Jul. 2009 vol. 30, Issue 7, pp. 948-954, (published online: Jun. 20, 2008 |DOI: 10.1002/pc.20639), online @ http://onlinelibrary.wiley.com/doi/10.1002/pc.v30:7/issuetoc.*

* cited by examiner

ORGANIC/INORGANIC COMPOSITIVE DISPERSANT INCLUDING INORGANIC CLAY AND ORGANIC SURFACTANT

CROSS REFERENCE TO RELATED APPLICATIONS

The present application is a continuation of prior U.S. application Ser. No. 12/765,853 filed Apr. 22, 2010, entitled "ORGANIC/INORGANIC COMPOSITIVE DISPERSANT INCLUDING INORGANIC CLAY AND ORGANIC SURFACTANT", now U.S. Pat. No. 8,362,092 B2. The prior U.S. Application claims priority of Taiwan Patent Application No. 098113565, filed on Apr. 23, 2009, the entirety of which is incorporated herein by reference.

BACKGROUND OF THE INVENTION

1. The Field of the Invention

The present invention relates to a dispersant, and particularly to a compositive dispersant including inorganic clay and an organic surfactant. The dispersant can be applied to dispersing nano-scaled powders or particles by decreasing viscosity of the powders in organic solvents. The powders or particles include white $TiO_2$ pigments, color filters, red/green/blue/yellow color pigments of liquid crystal displays and phosphor powders of light emitting diodes (LEDs).

2. Related Prior Arts

In industries, it's an important technology to uniformly disperse powders or particles, for example, pigments, carbon tubes, metals, etc., in solvents. Therefore, stable dispersants are required.

Layered or sheet-like inorganic clay, for example, nano silicate platelets (NSP), has high aspect-ratios ($100\times100\times1$ nm on an average), high specific surface areas ($700\sim800$ $m^2/g$) and high charge densities (18,000 ions/platelet), and therefore could be used to prevent coagulation. However, inorganic clay is generally hydrophilic and applications thereof are limited.

To solve this problem, the present invention provides an organic/inorganic compositive dispersant.

SUMMARY OF THE INVENTION

The object of the present invention is to provide an organic/inorganic compositive dispersant which can effectively disperse metal-oxide pigments such as $TiO_2$ and RGB organic pigments, an electrolyte of a solar cell, polymers, a cleaner, or other suitable nanoparticles.

To achieve the above object, the organic/inorganic compositive dispersant primarily comprises an inorganic clay and an organic surfactant complexed with the inorganic clay.

The method for producing the organic/inorganic compositive dispersant is to mix an inorganic clay and an organic surfactant in a solvent to perform a complex reaction.

That is, the surfactant with hydrophobic end groups is grafted onto the inorganic clay.

In the present invention, the inorganic clay is layered or sheet-like. The inorganic clay can be a natural silicate/aluminum oxide clay such as natural $Na^+$-montmorillonite ($Na^+$-MMT), an exfoliated clay such as nano silicate platelet (NSP), a synthetic fluoride mica, a synthetic nano-clay or other suitable inorganic clay such as K10, layered layered double hydroxides (LDH), kaolin, synthetic layered clay, talc, attapulgite clay, laponite and vermiculite. Among them, NSP and $Na^+$-MMT are preferred. In addition, the weight ratio of the inorganic clay to the organic surfactant is preferably about $1/1\sim30/1$.

In the present invention, the organic surfactant is anionic, nonionic or cationic. The cationic surfactant is preferably fatty (C12~C32) quaternary ammonium salts or fatty (C12~C32) quaternary ammonium chlorides. The nonionic surfactant is preferably octylphenol polyethoxylate or polyoxyethylene alkyl ether. The anionic surfactant is preferably sodium dodecyl sulfate (SDS).

Examples of the cationic surfactant include cetyl (C16) trimethyl ammonium compounds (HDTMA), dodecyl (C12) trimethyl ammonium (DDTMA) compounds, octadecyl ammonium chloride, tallow (C12~C18) quaternary ammonium chlorides, alkyl (C32) trimethyl ammonium chloride, cetyl (C16) trimethyl ammonium chloride, alkyl (C12: C14: C16=63:30:7) dimethyl benzyl ammonium chloride, didecyl dimethyl ammonium chloride and dehydrated tallow (C12~C18) dimethyl ammonium chloride.

When the cationic surfactants are used, the organic/inorganic compositive dispersant is primarily used to disperse a white $TiO_2$ pigment and usually results in a concentration about 1.5~3 wt %. Preferably, the dispersant is previously dispersed in methylcyclohexane.

When the nonionic surfactant is octylphenol polyethoxylate, the resultant organic/inorganic compositive dispersant can be applied to a gel-like electrolyte of a dye-sensitized solar cell (DSSC). The octylphenol polyethoxylate is preferably first dissolved in 3-methoxy-propionitrile (MPN) and has a concentration about 0.5~2 wt %.

When the anionic surfactant such as SDS is used, the resultant organic/inorganic compositive dispersant can be applied to reinforcing epoxy in an amount about 0.5~1.5 wt %. The dispersant is preferably dispersed in acetone before being added into epoxy.

The solvent used in the method is preferably water.

DETAILED DESCRIPTION OF THE PREFERRED EMBODIMENTS

Figure 1:
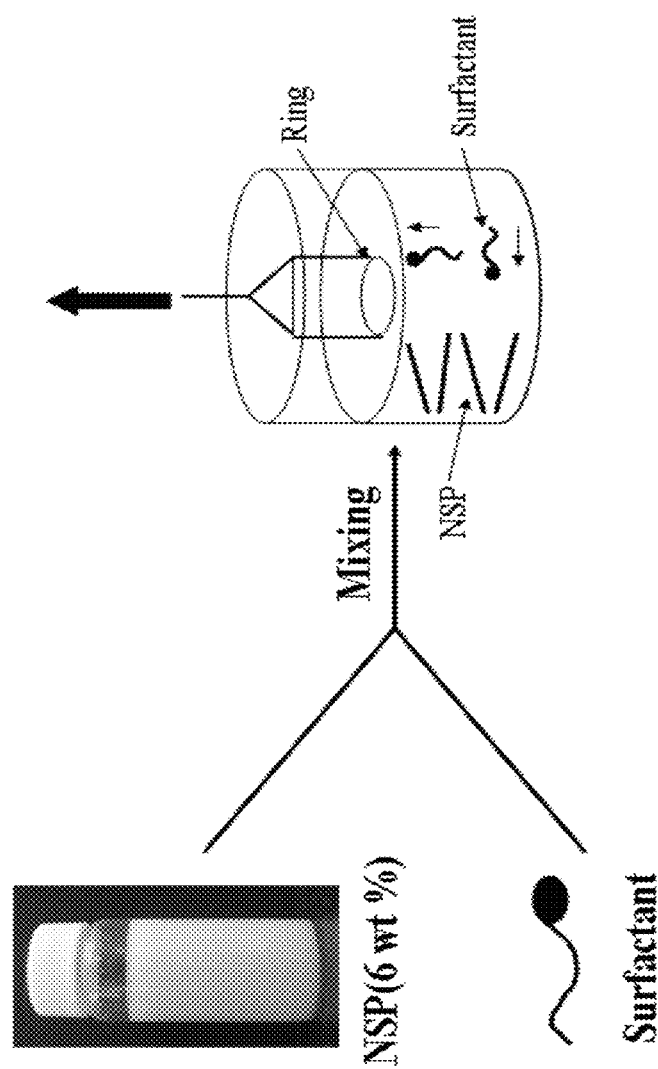
FIG. 1 shows the Ring Method for determining surface tensions.

The main materials used in the preferred embodiments of the present invention include:

1. Montmorillonite ($Na^+$-MMT): Purchased from Nanocor Ind. Co. (CEC=1.2 mequiv/g) and Kunimine Ind. Co. (Kunipia-F, CEC=1.15 mequiv/g).

2. Synthetic Nanoclay (SNC): Purchased from CO-OP Chemical Co., LTD (CEC=0.7~1.2 mequiv/g).

3. Polyoxyalkylene-amine: Product of Huntsman Chemical Co., Jeffamine® series including D-2000, T-403, T-5000, etc.; wherein D-2000 is poly(propylene glycol)bis(2-aminopropyl ether), Mw=2000, having structural formula:

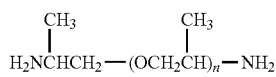

n = 33

4. Cetyl trimethyl ammonium (HDTMA): A cationic surfactant, critical micelle concentration (CMC)=0.1 wt %.

5. Dodecyl trimethyl ammonium (DDTMA): A cationic surfactant, CMC=1 wt %.

6. Octadecyl ammonium chloride: A cationic surfactant after being acidified with HCl to a quaternary ammonium salt.

7. Ablumine series: Tallow amine hydrochloride of C12~C18 or hydrogenated tallow amine hydrochloride, a cationic surfactant purchased from Taiwan Surfactant Co.

8. TRITON X-100: Octylphenol polyethoxylate, a nonionic surfactant purchased from TEDIA Co., CMC=0.01 wt %.

9. SINOPOL series: Polyoxyethylene alkyl ether, a nonionic surfactant purchased from SINO-JAPAN CHEMICAL.

10. Sodium dodecyl sulfate (SDS): An anionic surfactant, CMC=0.1 wt %.

The nano silicate platelet (NSP) can be produced according to the procedures described below or U.S. Pat. No. 7,022,299 B2, U.S. Pat. No. 7,094,815 B2, U.S. Pat. No. 7,125,916 B2, Publication No. 2005-0239943-A1 or application Ser. No. 11/464,495.

Preparation of NSP

Step (a): Na$^+$-MMT (10 g, Nanocor Ind. Co.) was dispersed in hot water (80° C., 1 L) with vigorous blending for 4 hours to form a stable, uniform and earth-color dispersion.

Step (b): P-cresol (27.2 g) and D2000 (757.6 g) (molar ratio of P-cresol/D2000=2:3) were mixed in toluene (90° C.) and reacted in a recirculation system for 3 hours. Then formaldehyde (37 wt %, 61.4 g) was added into the above solution and reacted at 130° C. for 5 hours. When a gel-like solution was generated, the reaction was stopped. The product was an intercalating agent, amine-termination Mannich oligomer (AMO). The GPC analysis of AMO showed three peaks respectively at Mw=3,142, 6,221 and 9,246. Amino titration showed that primary amine was 0.4 mequiv/g, secondary amine was 0.56 mequiv/g, and no tertiary amine existed. The AMO was then dissolved in water (575 g) and acidified by concentrated hydrochloric acid (35 wt %, 36 g) at 80° C. for 30 minutes. The acidified AMO was then poured into the above Na$^+$-MMT dispersion and vigorously blended at 80° C. for 5 hours for an intercalation reaction and obtain an AMO/Clay solution.

Step (c): Buffer solutions of various pH values were added into the AMO/Clay solution which then became a lightly yellow, viscid emulsion.

Step (d): After adding ethanol (7.5 L), the emulsion was filtered and the solid was mixed with ethanol (10 L). Then NaOH (9.2 g) was added and the solution was filtered to obtain a light yellow, translucent mixture of AMO/NSP, in which the ratio of organic/inorganic (OA) is about 40/60.

Step (e): The mixture of AMO/NSP was uniformly mixed with ethanol (10 L) and NaOH (the same equivalent). After water (10 L) was added and mixed well, toluene (10 L) was added and mixed uniformly. The solution was kept still for one day and separated into three layers. The upper layer was toluene and AMO, the middle layer was ethanol and the lower layer was the desired product, NSP in water.

The present invention will be illustrated by the preferred embodiments but not limited by them. Table 1 lists the types of inorganic clay and organic surfactant and their relative weight ratios used in the Examples described below.

TABLE 1

| Examples/ Comparative Examples | Inorganic clay | Organic surfactant | | Weight ratio of Inorganic/ Organic |
|---|---|---|---|---|
| 1a | NSP | Cationic | HDTMA | 4/1 |
| 1b | NSP | | | 2.5/1 |
| 1c | NSP | | | 2/1 |
| 1d | NSP | | | 1/1 |
| 1e | NSP | | | 0.1/1 |
| 2a | NSP | | DDTMA | 4/1 |
| 2b | NSP | | | 3/1 |
| 2c | NSP | | | 2/1 |
| 2d | NSP | | | 1/1 |
| 3a | MMT | | DDTMA | 30/1 |
| 3b | MMT | | | 10/1 |
| 3c | MMT | | | 1/1 |
| 3d | MMT | | | 0.1/1 |
| 4a | NSP | Nonionic | TRITON X-100 | 300/1 |
| 4b | NSP | | | 100/1 |
| 4c | NSP | | | 10/1 |
| 4d | NSP | | | 1/1 |
| 4e | NSP | | | 0.1/1 |
| 5a | NSP | Anionic | SDS | 30/1 |
| 5b | NSP | | | 10/1 |
| 5c | NSP | | | 1/1 |
| 5d | NSP | | | 0.1/1 |
| 6 | NSP | Cationic | Octadecyl ammonium chloride | 70/30 |

Examples 1a~1e

Preparing the NSP/HDTMA (Cationic) Mixtures

Step (a): The organic surfactant HDTMA was dissolved in water to give a CMC 0.1 wt %. The HDTMA solution was separated into five parts and the above NSP solution was added into each of them to obtain five NSP/HDTMA slurries having weight ratios respectively 4/1, 2.5/1, 2/1, 1/1 and 0.1/1.

Step (b): The NSP/HDTMA slurries were dried by spraying at 200° C. or freezing at −50° C. to obtain white powders.

Examples 2a~2d

Preparing the NSP/DDTMA (Cationic) Mixtures

Repeat step (a) and (b) of Example 1, except that HDTMA was replaced with DDTMA and the CMC was 1 wt %. The weight ratios of NSP/DDTMA were 4/1, 3/1, 2/1 and 1/1, respectively. The NSP/DDTMA slurries were dried by spraying or freezing to obtain powders.

Examples 3a~3d

Preparing the MMT/HDTMA (Cationic) Mixtures

Repeat step (a) and (b) of Example 1, except that NSP was replaced with MMT. The weight ratios of MMT/HDTMA were 30/1, 10/1, 1/1 and 0.1/1, respectively. The MMT/HDTMA slurries were dried by spraying or freezing to obtain powders.

Examples 4a~4e

Preparing the NSP/TRITON X-100 (Nonionic) Mixtures

Repeat step (a) and (b) of Example 1, except that HDTMA was replaced with TRITON X-100 and the CMC was 0.01 wt %. The weight ratios of NSP/TRITON X-100 were 300/1, 100/1, 10/1, 1/1 and 0.1/1, respectively. The NSP/TRITON X-100 slurries were dried by spraying or freezing to obtain powders.

Examples 5a~5d

Preparing the NSP/SDS (Anionic) Mixtures

Repeat step (a) and (b) of Example 1, except that HDTMA was replaced with SDS and the CMC was 0.1 wt %. The weight ratios of NSP/SDS were 30/1, 10/1, 1/1 and 0.1/1, respectively. The NSP/SDS slurries were dried by spraying or freezing to obtain powders.

Example 6

Preparing the NSP/Octadecyl Ammonium Chloride (Cationic) Mixture

Step (a): Octadecyl ammonium chloride was dissolved in water and then mixed with the NSP solution in a weight ratio 70/30 of organic/inorganic. Then the NSP/Octadecyl ammonium chloride slurry was obtained.

Step (b): The NSP/Octadecyl ammonium chloride slurry was dried by spraying at 200° C. in vacuum to obtain white powders.

Surface Tension Analysis

Surface tensions of the organic/inorganic mixture obtained in above Examples were determined with the Ring Method (as shown in FIG. 1) and a surface tension meter. The results are shown in FIGS. 2~6.

a. Effect of NSP on Surface Tensions of Cationic Surfactants

Figure 2:
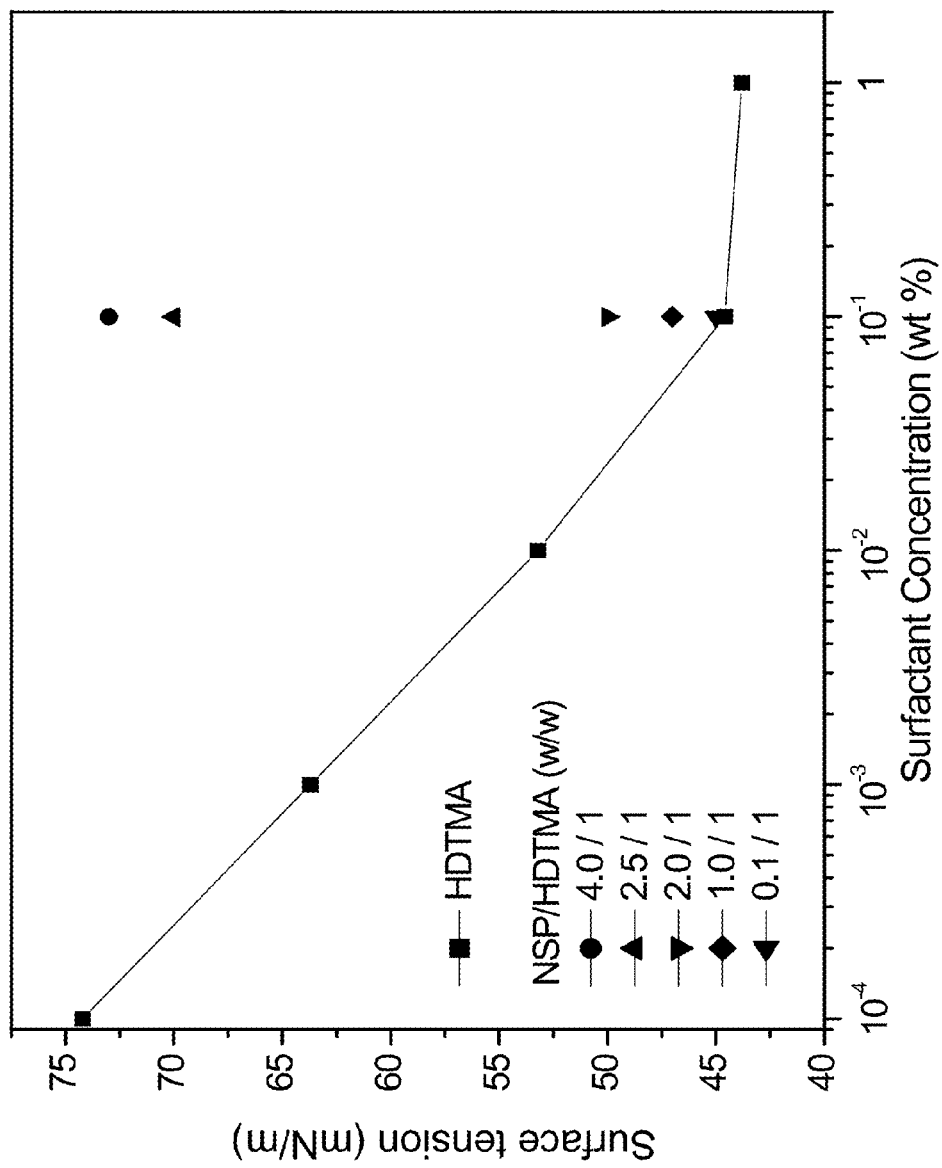
FIG. 2 shows the surface tensions of HDTMA at different concentrations and HDTMA at critical micelle concentration (CMC) mixed with different amounts of NSP.

The curve in FIG. 2 shows that HDTMA with 16 carbons has a CMC at 0.1 wt %. At this CMC, different amounts of the NSP were added. The results showed that surface tensions of HDTMA increased with the amounts of the NSP because the HDTMA molecules at the interface were adsorbed onto surfaces of the NSP. However, surface tensions of HDTMA were sharply increased from 52 mN/m to 70 mN/m when the amounts of the NSP were increased from 0.2 wt % to 0.25 wt %. The reason was that the density of the negative charges on the NSP surfaces was high, and thus strong ionic bonding were built between the NSP and the cationic surfactant HDTMA. Therefore, after the HDTMA micelles in the solution were adsorbed onto surfaces of the NSP at 0.2 wt %, more NSP (0.25 wt %) would adsorb a lot of HDTMA molecules at the interfaces and resulted in sharp increasing of the surface tensions.

Figure 3:
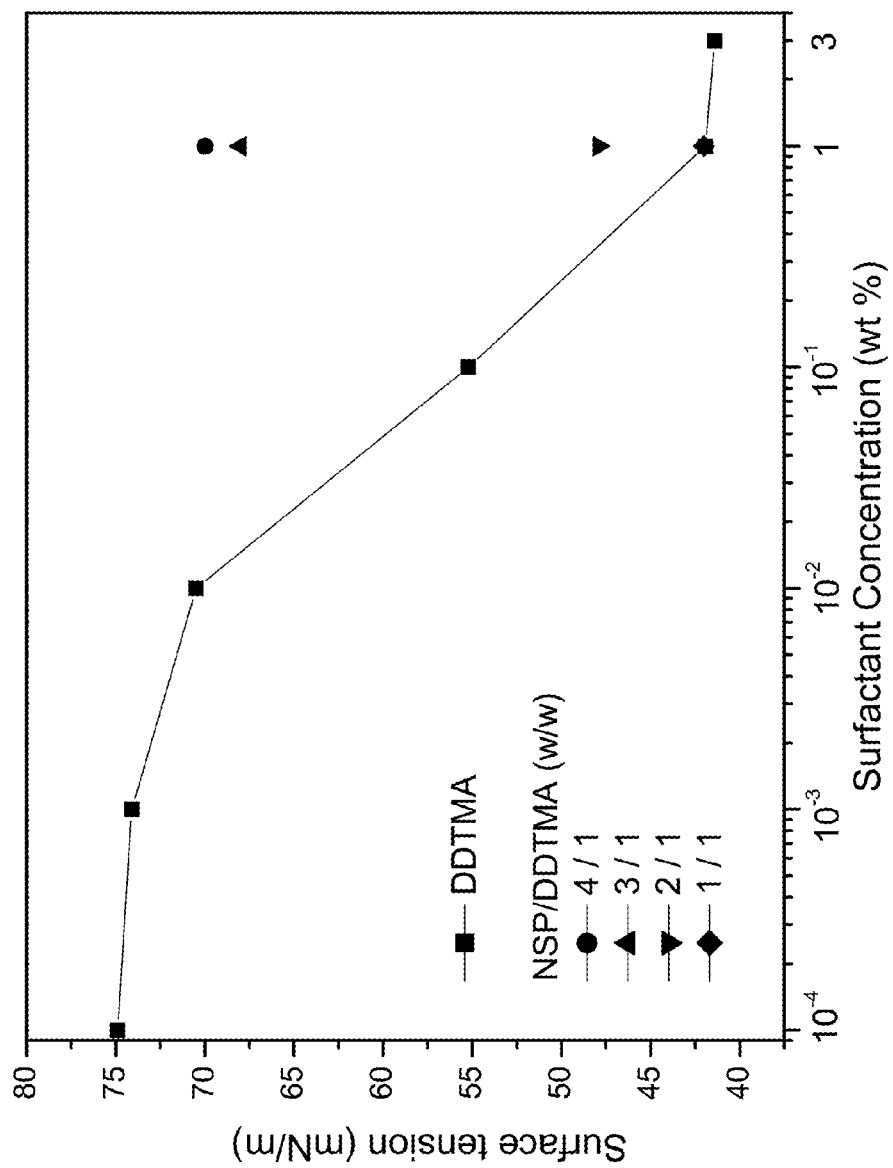
FIG. 3 shows the surface tensions of DDTMA at different concentrations and DDTMA (at CMC) mixed with different amounts of NSP.

The curve in FIG. 3 shows that DDTMA with 12 carbons has a CMC at 1.0 wt %. At this CMC, different amounts of the NSP were added. The surface tensions of DDTMA also increased with the amounts of the NSP and sharply increased when the amounts of the NSP were increased from 2.0 wt % to 3.0 wt %. The reason was the same as when the surfactant is HDTMA, i.e., more NSP would adsorb a lot of DDTMA molecules at the interfaces and resulted in sharp increase in the surface tensions.

b. Effect of NSP on Surface Tensions of Nonionic Surfactants

Figure 4:
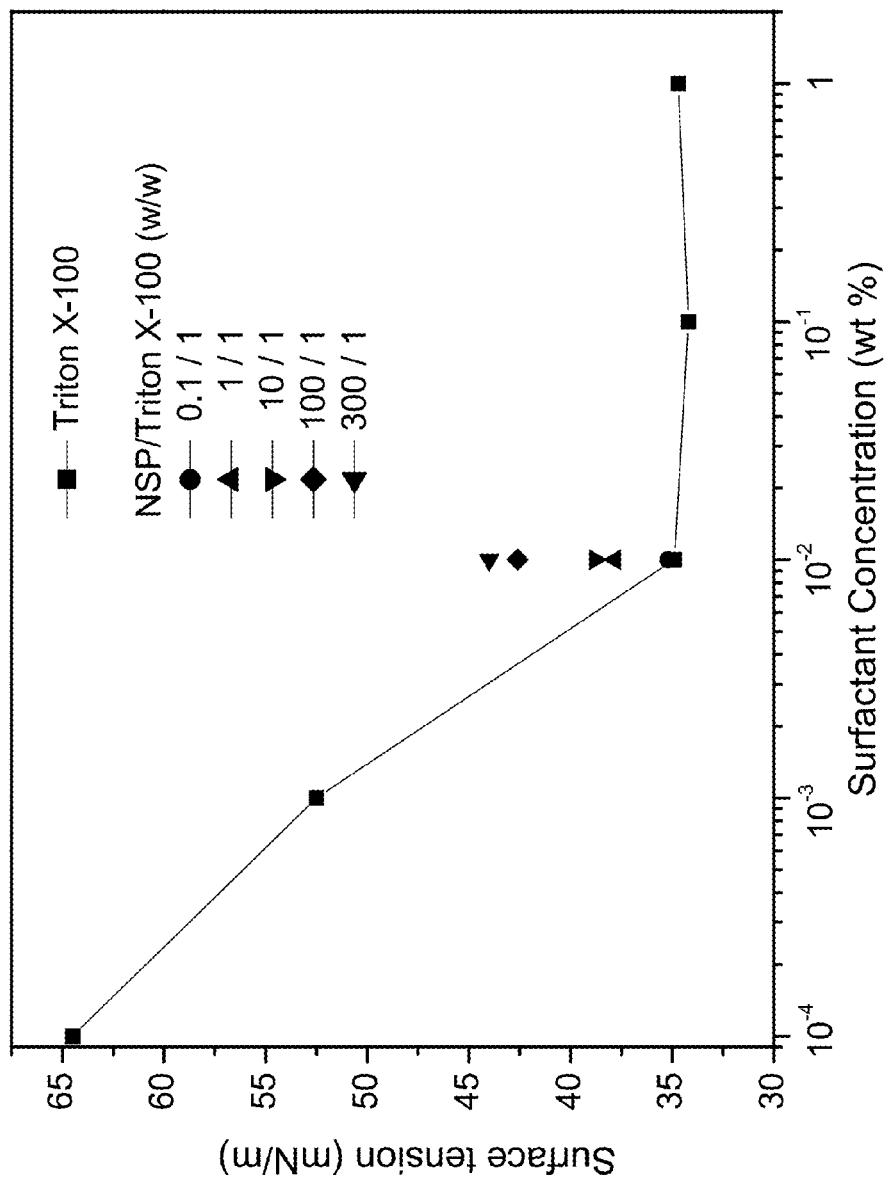
FIG. 4 shows the surface tensions of TRITON X-100 at different concentrations and TRITON X-100 (at CMC) mixed with different amounts of NSP.

The curve in FIG. 4 shows that TRITON X-100 has a CMC at 0.01 wt %. At this CMC, different amounts of the NSP were mixed with TRITON X-100 (nonionic) so that the solid contents of NSP were 0.001, 0.01, 0.1, 1 and 3 wt %. The results showed that the surface tensions increased with the amounts of the NSP. When contents of the NSP were 1~3 wt %, the surface tensions increased to 44 mN/m. The reason was that chelating occurred between the EO chain of TRITON X-100 and $Na^+$ ions on surfaces of the NSP, which would result in decrease in TRITON X-100 at the interfaces and increase in surface tensions.

c. Effect of NSP on Surface Tensions of Anionic Surfactants

Figure 5:
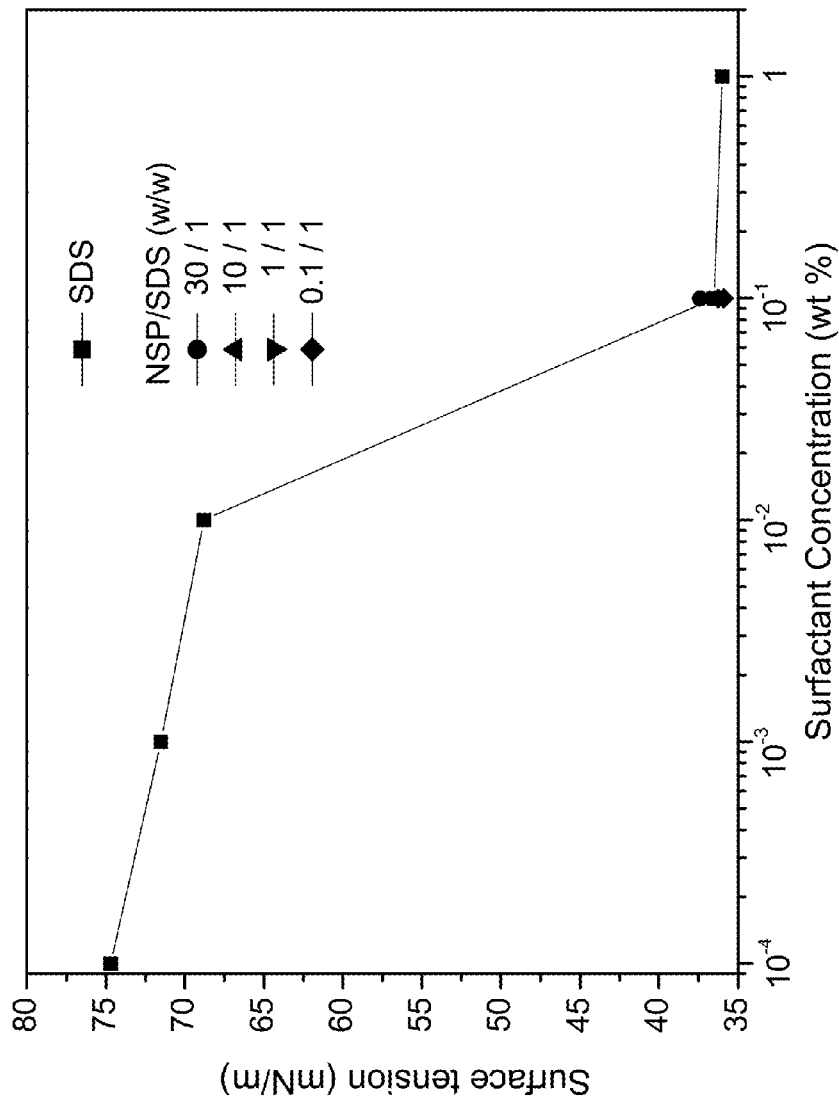
FIG. 5 shows the surface tensions of SDS at different concentrations and SDS (at CMC) mixed with different amounts of NSP.

The curve in FIG. 5 shows that SDS has a CMC at 0.1 wt %. At this CMC, different amounts of the NSP were mixed with SDS (anionic) so that the solid contents of NSP were 0.01, 0.1, 1 and 3 wt %. The results showed that surface tensions did not vary with the amounts of NSP. The reason was that negative charges on the NSP surfaces would not adsorb the anionic surfactant, SDS, and therefore surface tensions did not vary.

d. Comparing Effects of NSP and MMT on the Surfactants

Figure 6:
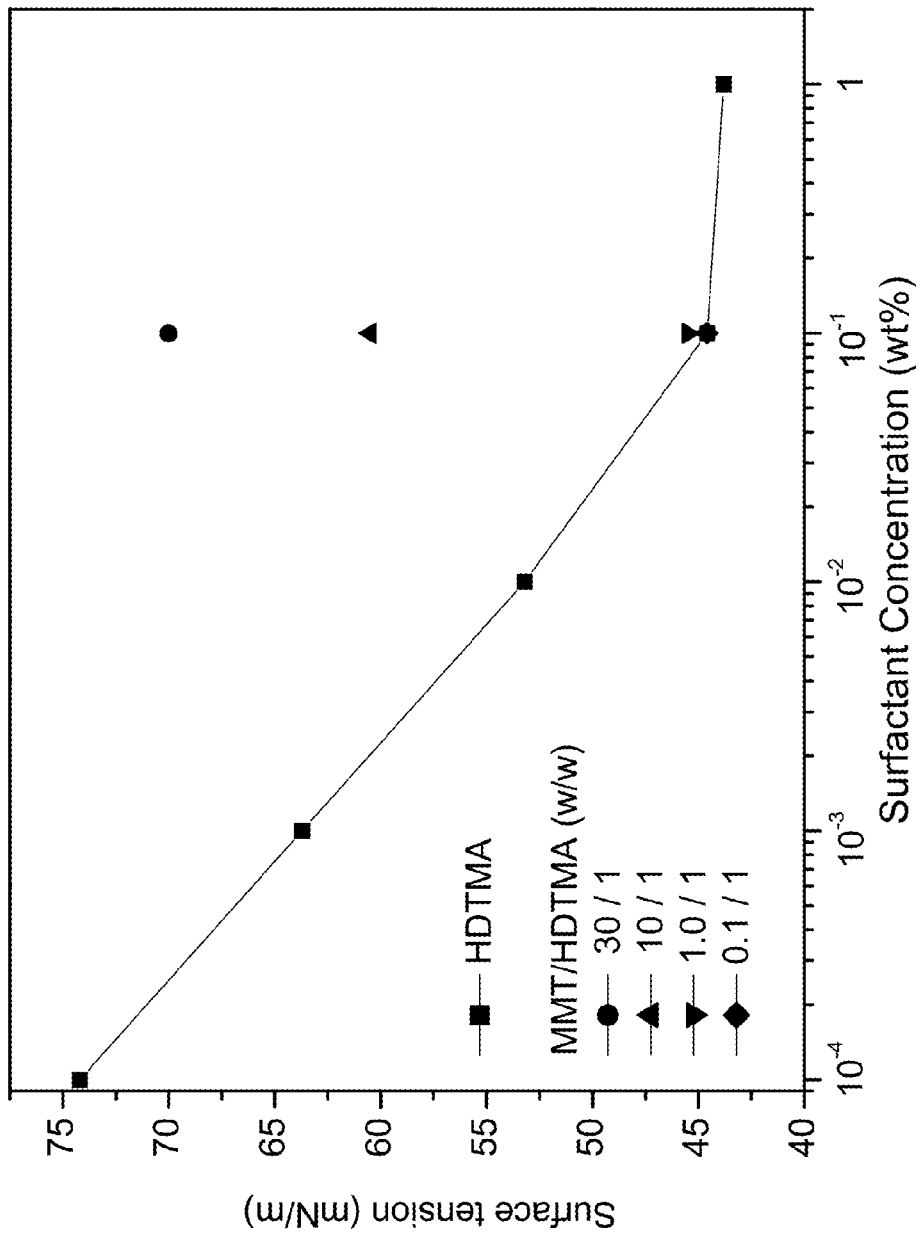
FIG. 6 shows the surface tensions of HDTMA at CMC mixed with different amounts of MMT.

FIG. 4 was compared with FIG. 6 which shows surface tensions of HDTMA (0.1 wt %) mixed with MMT. The results indicated that 3 wt % of MMT was required to achieve a surface tension of pure water, 72 mN/m, however the same could be achieved by only 0.25 wt % of NSP. The reason was that the exfoliated NSP had larger surface areas and more surface charges than MMT so that NSP could adsorb HDTMA more than MMT.

In summary, the cationic surfactants have the best effect in decreasing surface tensions than the nonionic surfactants, and the anionic surfactant has the worst. In other words, the abilities to complex with NSP were cationic>nonionic>anionic. Alternatively, ions of NSP—$Na^+$ have weaker interaction with the anionic surfactants, but stronger ionic exchanging reaction with the cationic surfactants to generate NSP/quaternary ammonium salts "NSP—$O^-N^+R$" and by-product NaCl, wherein R is a main chain of the surfactants or poly(oxyalkylene) groups of Jeffamine series. The new ionic complexes possess different chemical properties, for example, dispersing.

Figure 7:
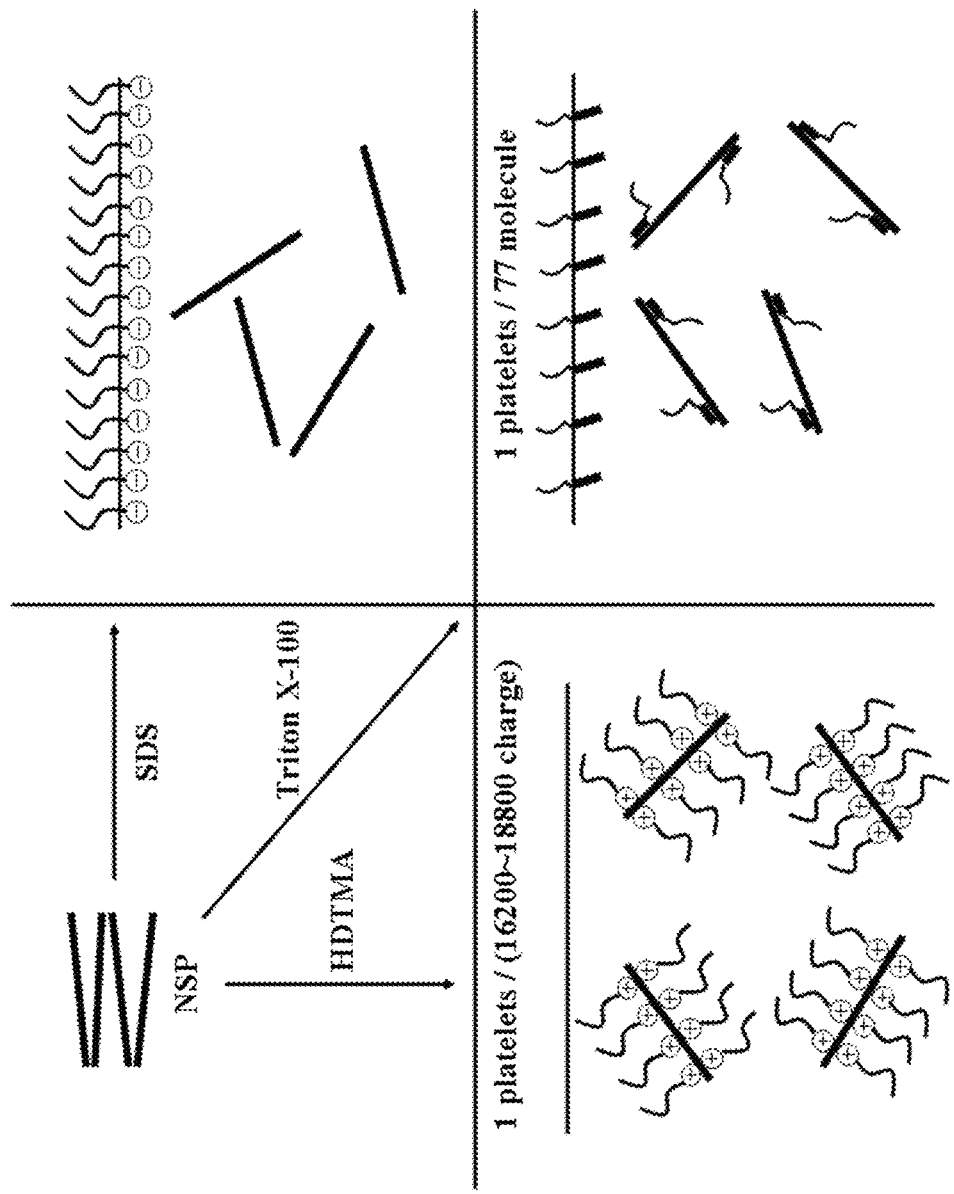
FIG. 7 shows the interactions between NSP and three surfactants.

In addition, the interactions between NSP and the nonionic surfactants, for example, $Na^+/$—$(CH_2CH_2O)_x$—, were polydental chelating but not through an ionic exchanging reaction. Though NSP reacted with the poly(oxyethylene) groups, original properties thereof were maintained. FIG. 7 illustrated the interactions between NSP and the surfactants.

APPLICATIONS

In the present invention, the modified NSP or MMT included hydrophobic ends and thus could be used as dispersants and applied to different solvent systems. By decreasing viscosities and promoting mobility and stability of materials, coagulation could be avoided.

1. Applying the Composites of NSP/Cationic Surfactant to White $TiO_2$ Pigments

The cationic surfactants in Table 2 below, i.e., octadecyl ammonium chloride and Ablumine series, were respectively mixed with NSP to prepare mixtures having I/O weight ratios 30/70, 50/50 and 70/30. The mixtures were then respectively dispersed in an organic solvent, methylcyclohexane. The NSP modified by the cationic surfactants had the hydrophobic property and thus could be uniformly dispersed in methylcyclohexane. The solutions including the dispersants were then added into $TiO_2$ pigments wherein the contents of NSP/cationic surfactant were 2 wt %. Effects of dispersing in $TiO_2$ pigments were assessed. The results indicated that the sheet-like NSP could disperse spherical $TiO_2$ pigments without coagulation through a geometrically dispersing mechanism. The dispersants of the present invention could effectively reduce viscosity and promoting mobility and stability of materials, and thus could replace commercial organic dispersants.

TABLE 2

| Cationic surfactant | Structural formula |
|---|---|
| Octadecyl Ammonium Chloride [$C_{18}H_{37}NH_3^+Cl^-$] | (C18 alkyl chain)–NH₂ |
| Tallow Ammonium Chlorides [a mixture of $C_{16}H_{33}NH_3^+Cl^-$ and $C_{18}H_{37}NH_3^+Cl^-$] | (C16 alkyl chain)–NH₂ and (C18 alkyl chain)–NH₂ |
| ABLUMINE M462 [Alkyl ($C_{32}$) Trimethyl Ammonium Chloride] | [$C_{32}H_{65}$–N(CH₃)₃]⁺ Cl⁻ |
| ABLUMINE TMC [Cetyl Trimethyl Ammonium Chloride] | [$C_{16}H_{33}$–N(CH₃)₃]⁺ Cl⁻ |
| ABLUMINE 1214 [Alkyl ($C_{12}$:$C_{14}$:$C_{16}$ = 63:30:7) Dimethyl Benzyl Ammonium Chloride] | [R–N(CH₃)₂–CH₂–C₆H₅]⁺ Cl⁻ |
| ABLUMINE DD [Didecyl Dimethyl Ammonium Chloride] | [$C_{16}H_{33}$–N(CH₃)₂–$C_{16}H_{33}$]⁺ Cl⁻ |
| ABLUMINE DHT75 [Dihydrogenated Tallow ($C_{12}$~$C_{18}$) Dimethyl Ammonium Chloride] | [R–N(CH₃)₂–R]⁺ Cl⁻ |

TABLE 3

| Nonionic surfactant | Structural formula |
|---|---|
| TRITON X-100 [t-Octylphenoxy-polyethoxyethanol] | $C_8H_{17}$–(C₆H₄)–(OCH₂CH₂)$_{9.5}$–OH |

2. Applying the Composites of NSP/Nonionic Surfactant to the Electrolyte of the Solar Cell The nonionic surfactants in Table 3 below, i.e., TRITON X-100 and SINOPOL series, were respectively mixed with NSP to prepare mixtures having I/O weight ratios 30/70, 50/50 and 70/30. The mixtures were then respectively dispersed in an organic solvent, 3-methoxy-propionitrile (MPN). The NSP modified by the nonionic surfactants had the hydrophobic property and thus could be uniformly dispersed in MPN. The dispersant solution (including 1 wt % of NSP/TRITON X-100) was used as a gel-like electrolyte of a dye-sensitized solar cell (DSSC) and the conversion efficiency was promoted from 3.56% to 4.55%.

TABLE 3-continued

| Nonionic surfactant | Structural formula |
|---|---|
| SINOPOL 1802 [Polyoxyethylene Alkyl ($C_{18}$) Ether] | $C_{18}H_{37}O$–(CH₂CH₂O)$_2$–H |
| SINOPOL 1816 [Polyoxyethylene Alkyl ($C_{18}$) Ether] | $C_{18}H_{37}O$–(CH₂CH₂O)$_{16}$–H |
| SINOPOL 1830 [Polyoxyethylene Alkyl ($C_{18}$) Ether] | $C_{18}H_{37}O$–(CH₂CH₂O)$_{30}$–H |

TABLE 3-continued

| Nonionic surfactant | Structural formula |
|---|---|
| SINOPOL 2307 [Polyoxyethylene Alkyl ($C_{13}$) Ether] | $C_{13}H_{27}O-(CH_2CH_2O)_7-H$ |
| SINOPOL 2340 [Polyoxyethylene Alkyl ($C_{13}$) Ether] | $C_{13}H_{27}O-(CH_2CH_2O)_{40}-H$ |

3. Applying the Composite of NSP/Anionic Surfactant to Epoxy

In the present invention, the mixture of NSP and SDS as shown in Table 4 below could be dispersed in the organic solvent, acetone, and had a solid content up to 10 wt %. By adding a little NSP/SDS (1 wt % in epoxy, and removing acetone by vacuum), the hardness of epoxy could be increased from 2H to 6H.

TABLE 4

| Anionic surfactant | Structural formula |
|---|---|
| SDS [Sodium Dodecyl Sulfate] | $CH_3-(CH_2)_{11}-O-\overset{O}{\underset{O}{\overset{\|}{\underset{\|}{S}}}}-O^-\ Na^+$ |

In addition, at the same weight ratios and contents in the $TiO_2$ pigments, the composite of NSP and the cationic surfactant (Ablumine M462) performed the best dispersion, when compared with the nonionic surfactant (TRITON X-100) and the anionic surfactant (SDS). By being dissolved in an organic solvent, the composite of NSP/Ablumine M462 could uniformly disperse the $TiO_2$ pigment for a long time so that the pigment could be easily coated on substrates, glasses or paper.

In the present invention, the organic/inorganic compositive dispersant was formed by the inorganic clay such as NSP and the organic surfactant (i.e., quaternary ammonium salts) through noncovalent bonding. The inorganic clay modified with different surfactants at different weight ratios had respective hydrophilic/hydrophobic properties and thus exhibited different compatibilities in different solvents. By controlling such compatibilities, coagulation and settling could be avoided.

What is claimed is:

1. A method for increasing hardness of an epoxy resin, comprising steps of:
    (a) dispersing a mixture of nanosilicate platelets (NSP) and an anionic surfactant in an organic solvent to form a solution having a solid content up to 10 wt %, wherein the nanosilicate platelets (NSP) is prepared by adding NaOH into a AMO/clay solution which is obtained by blending acidified amine-termination Mannich oligomer (AMO) with montmorillonite (MMT);
    (b) adding the solution of step (a) in an epoxy resin; and
    (c) removing the organic solvent from the epoxy resin.

2. The method of claim 1, wherein the anionic surfactant of step (a) is sodium dodecyl sulfate (SDS).

3. The method of claim 2, wherein the mixture of NSP and SDS in the epoxy resin of step (b) has a concentration of about 1 wt %.

4. The method of claim 1, wherein the organic solvent of step (a) is acetone.

* * * * *